United States Patent [19]

Lippert et al.

[11] 4,343,395
[45] Aug. 10, 1982

[54] ROLLER HEARTH FURNACE

[75] Inventors: Charles Lippert, Pinckney; Leonard G. Nowak, Ypsilanti; Paul K. Shefsiek, Farmington, all of Mich.

[73] Assignee: Holcroft & Co., Livonia, Mich.

[21] Appl. No.: 850,167

[22] Filed: Nov. 10, 1977

[51] Int. Cl.³ .............................................. B65G 13/06
[52] U.S. Cl. .................................... 198/781; 198/789; 65/253; 432/236; 432/246
[58] Field of Search ................ 198/780, 781, 789–791; 432/236, 246, 251; 65/253

[56] References Cited

U.S. PATENT DOCUMENTS

| | | | |
|---|---|---|---|
| 1,791,404 | 2/1931 | Fahrenwald | 432/246 |
| 2,788,957 | 4/1957 | Lindqvist | 432/246 |
| 3,608,876 | 9/1971 | Leaich et al. | 432/246 |
| 3,867,748 | 2/1975 | Miller | 432/246 |
| 4,242,782 | 1/1981 | Hanneken et al. | 432/236 |

Primary Examiner—Joseph E. Valenza
Attorney, Agent, or Firm—Herbert E. Messenger; James L. Neal

[57] ABSTRACT

A high temperature furnace chamber includes a roller hearth for supporting and transporting workpieces to be heated. The rollers are supported at each end by a rotary sleeve having an inner diameter larger than the outer diameter of the rollers. Rotary movement of the sleeves transmits rotational forces to the rollers. Clearance provided between the rollers and the sleeves allows for roller dimensional variation during various furnace operating conditions.

6 Claims, 5 Drawing Figures

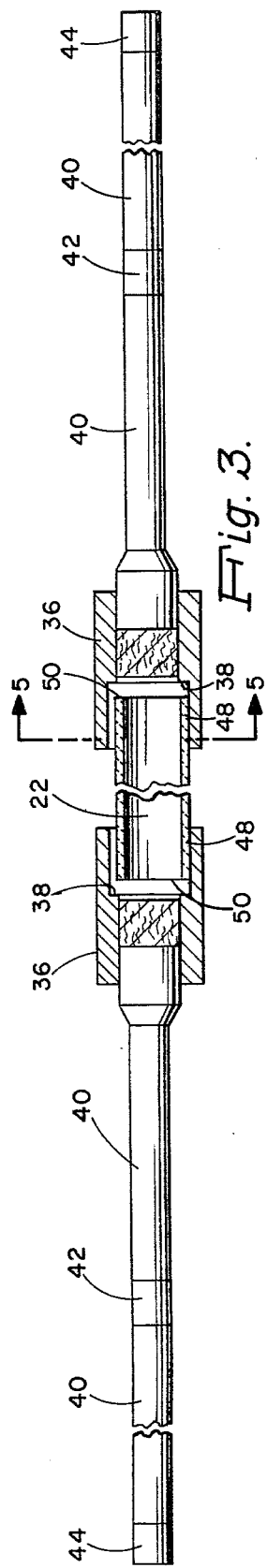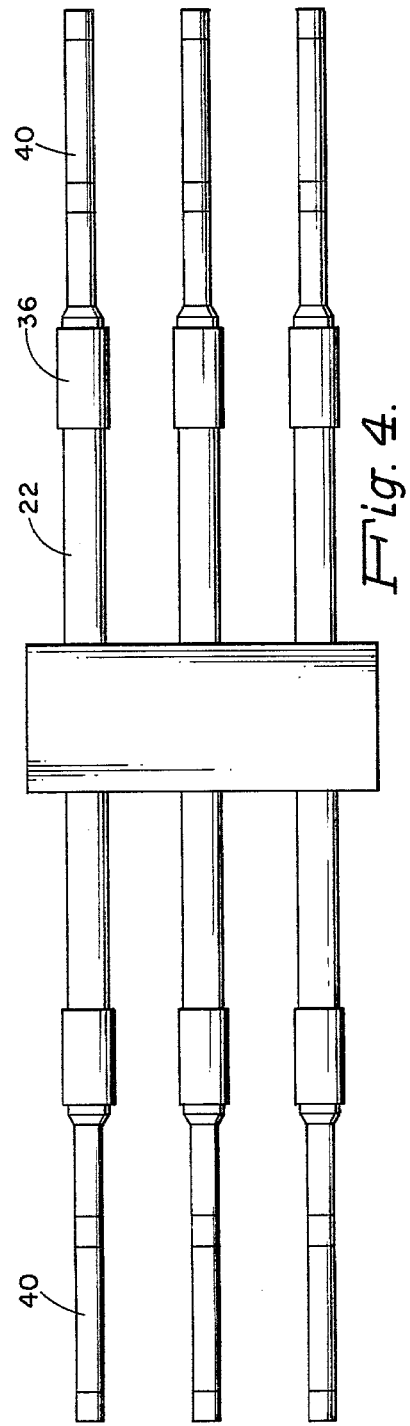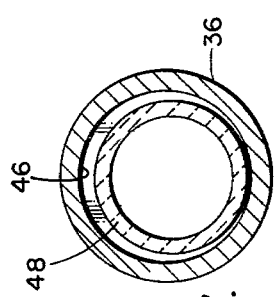

ROLLER HEARTH FURNACE

BACKGROUND OF THE INVENTION

This invention relates to high temperature furnaces and particularly to such furnaces having refractory rollers forming a hearth for supporting therein and transporting therethrough workpieces to be treated.

One of the limiting factors in high temperature furnace operation is the temperature level which the components inside the heated furnace chamber can withstand. Typically furnaces use mesh belts, alloy rollers, pushers and similar devices to support or transport material. These devices are unable to withstand the desired high temperature levels associated with some processes.

For example, in sintering processes associated with the metallurgical techniques used in the manufacture of certain metal parts, a temperature level above that which conventional metal alloy furnace rollers can withstand is desirable. According to a common technique, powdered metal is compressed into a desired shape and then sintered to fuse the powder into a unitary piece without melting it. Generally, the higher the temperature to which the workpieces can be brought without melting, the better will be their strength characteristics and overall quality. Such workpieces frequently withstand higher temperature levels without melting than the furance transport mechanism can withstand without melting or otherwise deteriorating to such an extent that its operation is hindered.

It is therefore an object of the present invention to provide a furnace transport mechanism capable of withstanding constantly high furnace temperatures.

It is also an object of the present invention to provide a furnace transport mechanism wherein a series of rollers define a hearth for supporting or transporting the materials to be heated and wherein the rollers are flexibly mounted to provide clearance between the roller and the mounting structure to compensate for roller deformation during furnace operation.

It is a further object of the present invention to provide a furnace transport mechanism utilizing refractory rollers forming a work supporting and transporting hearth.

It is a further object of the present invention to provide a high temperature furnace transport mechanism having strength sufficient to support a substantial weight thereon.

SUMMARY OF THE INVENTION

A roller hearth furnace includes a chamber or zone for heating workpieces to a desired temperature and for holding the workpieces therein for a time interval appropriate to the particular heat process cycle being carried out. The furnace chamber includes a workpiece supporting and transporting hearth which comprises one or more cylindrical rollers. The rollers have mounting sections thereon for positioning the rollers within the furnace chamber. Each mounting section is loosely supported in a retaining sleeve which defines a cavity of larger cross sectional diameter than the diameter of the mounting section it supports. A driving system rotates the sleeve, thereby to drive the roller. The oversized roller retaining sleeve allows thermal expansion of the roller in all directions and can automatically compensate for unevenly circularity of the roller which may develop, particularly at high temperatures.

For high temperature furnace operation such as that associated with powdered metallurgy, a refractory material is needed to withstand desired temperatures inside the furnace. The rollers may be constructed of ceramic or other suitable refractory materials. Ceramic rollers may be formed of numerous materials including, but not limited to, aluminum oxide, silicon carbide, zirconium oxide and these compounds forming a base with other constituents. The roller and sleeve construction of this invention avoids difficulties associated with a rigid ceramic-metal joint under high temperature and mechanical stress conditions.

In a preferred embodiment, roller supporting sleeves are interconnected with each other so that all the sleeves rotate simultaneously, continuously and in unison. The resulting continuous rotation of the ceramic rollers tends to minimize uneven heat distribution throughout the rollers, thereby to minimize non-symmetrical temperature induced deformation such as roller sag. The roller drive mechanism, when utilized in a high temperature furnace, is operated continuously so the constantly rotating rollers will experience uniform heat distribution throughout.

BRIEF DESCRIPTION OF THE DRAWINGS

FIG. 3, is a partially sectioned and broken away view of a roller constructed according to the present invention.

FIG. 4 is a top view illustrating a plurality of rollers of the type shown in FIG. 4 supporting a workpiece thereon.

FIG. 5 is a sectional view taken along line 5—5 of FIG. 4.

DETAILED DESCRIPTION OF THE DRAWINGS

Figure 1:
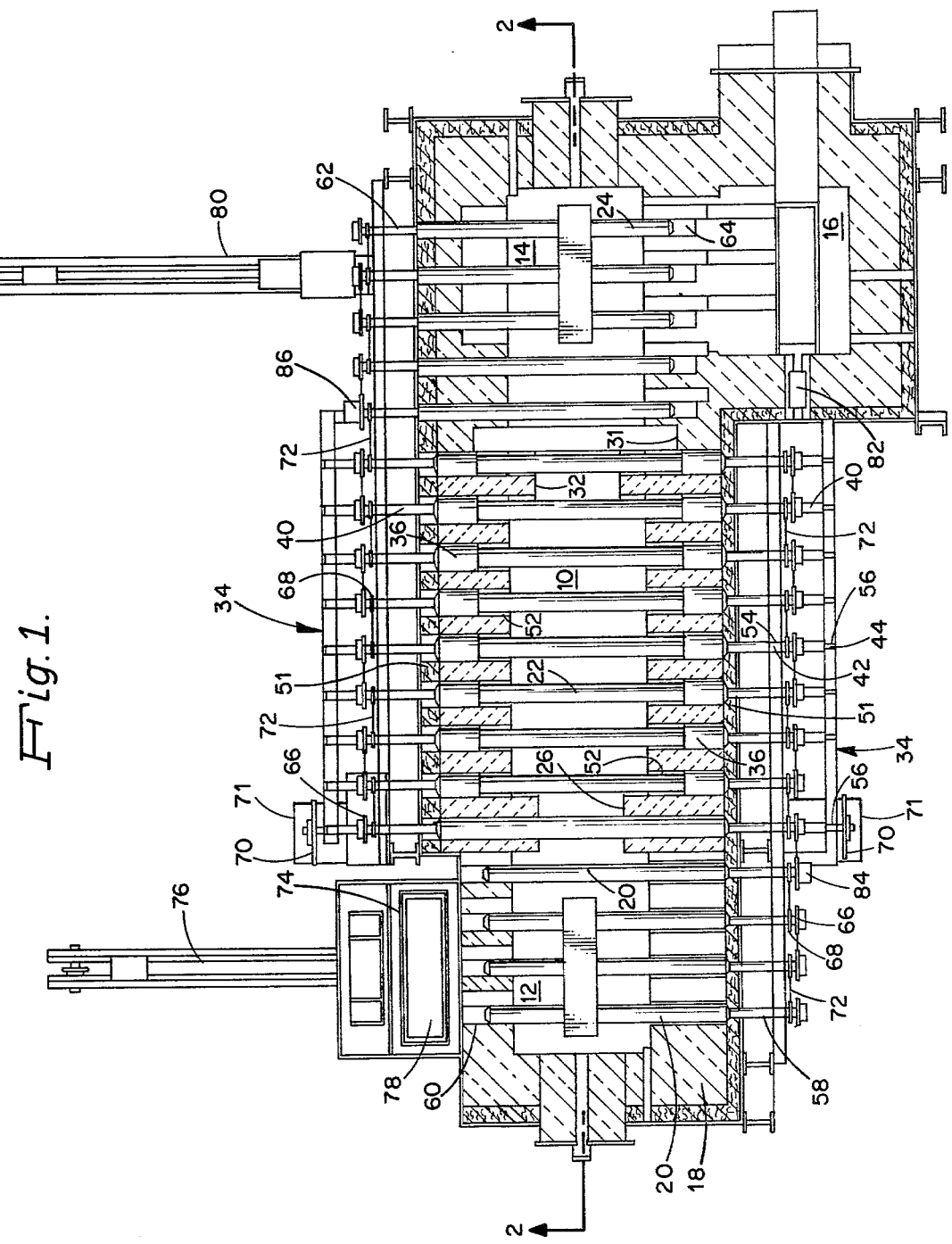
FIG. 1 is a partially sectioned top view of a furnace embodying the present invention.
Figure 2:
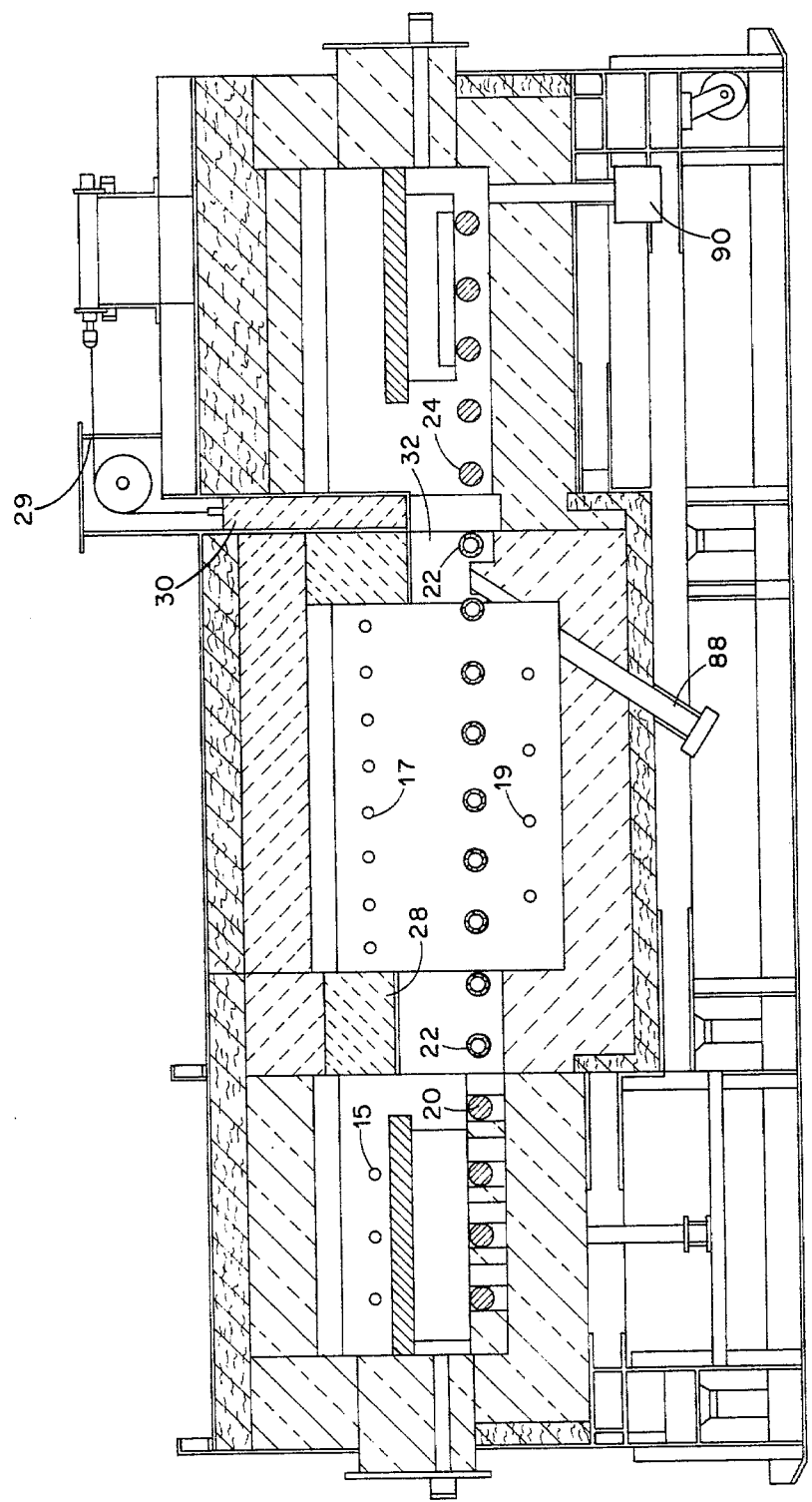
FIG. 2 is a sectional side view of the furnace illustrated in FIG. 1, taken along lines 2—2.

FIGS. 1 and 2 illustrate a high temperature sintering furnace for sintering compressed powdered metal parts to fuse the powdered metal into a unitary piece without melting it. The furnace includes a primary heating chamber 10, a preheat chamber 12, a cooling chamber 14 and a holding chamber 16. The chamber 12 is provided with heating elements 15 and the chamber 10 is provided with heating elements 17 and 19. The heating elements may be of any suitable type including electrically powered silicon carbide heating elements. The furnace walls 18 are of a suitable, relatively thick, refractory material through which rollers 20, rollers 22 and rollers 24 extend for connection to an external driving means, subsequently described. The primary heating chamber 10 is separated from the prechamber 12 by projecting wall sections 26 and 28. The primary chamber is separated from the cooling chamber 14 by a heat shield door 30 which opens and closes a port 32. The door 30 is reciprocally mounted in a slot 31 and is operated by a lift means 29.

Rollers 20 and 24 may be conventional metal alloy rollers or any convenient type and are located, respectively, in the preheat chamber 12 and the cooling chamber 14. The rollers 22 are of refractory material and are located in the primary furnace chamber 10. The rollers are all rotated in unison by a roller drive means 34 which has the capability of continuously driving all rollers during operation of the furnace.

The rollers 22 and the drive means 34 will now be described in detail. The rollers 22 can best be understood by reference to FIGS. 3 through 5. In FIG. 3 there is illustrated a roller 22 associated at each end with a supporting and driving sleeve 36 having a cavity of larger inner diameter than the outer diameter of the end of the roller. The sleeve 36 forms with the roller 22 a slip joint. The slip joint provides for movement of the roller relative to the sleeve both in the direction axial of the roller and the direction radial of the roller. This provides a junction of the roller to its supporting and driving mechanism which has the flexibility required to compensate for expansion, contraction and deformation of the roller. Extending from a closed end of the sleeve 36 is a drive shaft 40 having thereon journals 42 and 44. As the sleeves 36 are rotated by the drive shaft 40, they impart to the roller 22 the desired rotary motion. As will be understood in reference to FIGS. 3 and 5, the sleeves 36 drive the roller 22 through frictional engagement between the inwardly facing annular surface 46 of each sleeve 36 and the outer circumference of each end portion 48 of the roller 22. End portions 48 function as mounting sections for the roller 22. Techniques to augment frictional engagement can be used although these have not been found essential.

Within each sleeve 36 an abutment 38 is formed for limiting travel of the roller 22 along its longitudinal axis. The drive shaft 40 mounts the sleeve 36 so that the abutment 38 confronts the terminal end 50 of the roller 22. The abutments 38 of opposed sleeves are displaced from each other by a distance which is slightly in excess of the length of the roller 22 so that the slip joints formed between the sleeves and the rollers allow the requisite freedom of movement and compensate properly for expansion, contraction and deformation of the roller 22. The gap between the terminal ends 50 of the roller and the abutments 38 can vary according to the design of the system. However, the space separating the pair of abutments 38 should be at least slightly in excess of the length of the roller 22 at maximum anticipated temperature. Insulating material may be used between the shafts 40 and the terminal ends 50 of the roller 22 to reduce heat losses through the slip joint.

As tolerance between a mounting section 48 and its corresponding surface 46 increases, the ability to compensate for roller expansion, contraction and deformation increases and the driving force between the sleeve 36 and mounting sections 48 decreases. Correspondingly, as the tolerances between sections 48 and surfaces 46 decrease, the driving force increases and the ability to compensate for expansion, contraction and deformation decreases.

FIG. 4 illustrates an array of the rollers 22 driven by an associated array of sleeves 36 which form a hearth to support either a workpiece or a tray on which several workpieces may be placed.

Opposed side walls 51 of the furnace chamber 10 are provided with cylindrical bores 52 of sufficiently large diameter to receive the outer diameter of a cylindrical sleeve 36 but small enough to provide a minimum tolerance between the sleeve 36 and the inner diameter of the bore 52 to reduce heat losses from the furnace chamber. The rollers 22 extend across the chamber 10 and penetrate the side walls 51. The retaining sleeves 36 are supported within the side walls 51 by the journals 42 and 44 which are mounted in bearings 54 and 56, respectively. The fact that the rollers 22 stay entirely within the furnace walls lowers the thermal gradient along the rollers and thereby increases their resistance to high temperature.

The drive means 34 drives rollers in furnace chambers 10, 12 and 14. The rollers in furnace chambers 12 and 14 are conventional rollers and may be driven from one end only. The rollers 22 in the chamber 10 are driven from both ends. Rollers 20 are provided with drive shafts 58 at one end and supported at the other end by a bore 60. Similarly, the rollers 24 are driven at one end by a shaft 62 and supported at the opposite end by a bore 64. Shafts 58, 62 and 40 are each provided with two sprockets, an outer sprocket 66 and an inner sprocket 68. In addition, one of the conventional roller assemblies includes primary drive sprockets 70 mounted outwardly of its bearings 56. The sprockets 70 form the primary drive for the entire system of rollers. The roller to which the sprockets 70 are mounted will be termed the driving roller. Each drive shaft is interconnected with the adjacent drive shafts on the same side of the furnace by a series of sprocket-driving chains 72. Each roller is thus connected to each adjacent roller. For example, in a series of rollers the driving roller and a second roller may be connected by a chain 72 drivingly engaging their respective sprockets 68; the second roller and a third roller may be connected by a chain 72 drivingly engaging their sprockets 66; the third roller and a fourth roller may be connected by a chain 72 drivingly engaging their sprockets 68, etc. in alternating fashion. The driving roller extends across the furnace to drive both ends of the rollers 22, one end of the rollers 20 and the opposite end of the rollers 24. All of the sprockets are sized to produce uniform rotation of all rollers. However, if certain rollers are to rotate faster than others, the sprocket design may be adjusted to accomplish this.

To facilitate loading and unloading of the furnace, various work moving devices are provided. Adjacent the preheat chamber 12 an elevator 74 is associated at its upper position with a pusher 76. The elevator lifts a work supporting tray 78 to the level of the hearth formed by the rollers 20. The pusher 76 slides the work supporting tray 78 from its position on the elevator onto the rollers 20. A pushacross 80 associated with the cooling chamber 14 slides the work supporting tray 78 from its position on the rollers 24 to the holding chamber 16 from which it is removed by a pushoff 82.

The drive sprockets 70 may be powered by a drive motor means 71 adapted to provide relatively slow rotational movement to the rollers. A variable drive motor may be provided to variably determine the transit time of work in the chamber 10. Typically, this time would be variable between 10 and 30 minutes. The rotary motion of the rollers advances to the tray from the preheating chamber, through the primary heating chamber 10 and then to the cooling chamber 14.

If it is desired to maintain the work in a chamber 12 or 14 for a longer period of time than would be required for the material to travel therethrough on the roller hearth, its passage is interrupted to provide the necessary residence time. For preheat chamber 12 and cooling chamber 14 magnetic clutches 84 and 86, respectively, are provided to controllably terminate rotation of the rollers 20 and 24 while permitting continuous rotation of the rollers 22 in the primary heating chamber 10.

In the preferred embodiment herein described, the preheat chamber 12 is maintained at approximately 1800° F. and the primary heating chamber at approximately 2500° F. When the tray with the powdered metal workpieces thereon is to be retained in the preheating chamber, the operator releases the magnetic clutch 84 so that the sprocket 66 associated therewith is disengaged from the associated shaft 58 and rollers 20 do not turn. When sufficient residence time in the preheating chamber 12 is accomplished, the clutch is engaged and the tray of work is transmitted to rotating rollers 22 in the primary heating chamber 10. Upon nearing the end of the chamber 10, a radiamatic pyrometer means 88 senses the presence of the tray and causes lift means 29 to raise the door 30 so that the tray may be introduced onto the rollers 24 in the cooling chamber 14. The door 30 is thereafter closed automatically. If the tray is to be retained in the cooling chamber 14, sensing means 90 associated with the cooling chamber provides a signal in response to which the clutch 86 disengages its associated sprocket 66 from the associated shaft 62. The rollers 24 are then stationary for an interval sufficient to permit the work to cool. After sufficient cooling time is provided, the pushacross 80 discharges the work from the roller 24 to the holding chamber 16. The clutch 86 may be reengaged to drive the rollers 24 upon discharge of the work, or, if desired, these rollers may be reengaged only in response to a signal given when the door 30 is reopened. When the primary chamber 10 is operated at temperatures of 2500° F. and above, it is desirable for the refractory rollers 22 to rotate continuously to provide even heat distribution therethrough. At this high temperature, conventional roller materials tend to fail and, under some circumstances, the refractory rollers will exhibit sag if they are subjected to uneven heat distribution.

The rollers 22 may be manufactured of any suitable refractory material. Ceramic materials are preferred and in the embodiment herein described high purity aluminum oxide rollers have been used with considerable success. Alternatives include rollers of aluminum oxide mixed with various compounds such as silicon oxide and magnesium oxide. Generally, greater strength is obtained with the very high purity aluminum oxide. A product sold under the trade name Mullite by McDanel Refractory Porcelain Company, 510 Ninth Ave., Beaver Falls, Pa. is one commercially available material which can be used. The rollers might also be formed of a material having as its base silicon carbide or zirconium oxide. The sleeves 36 may be constructed of any appropriate material which resists oxidation and provides the necessary strength at the desired operating temperature. Nickel-iron alloys are satisfactory. When the furnace chamber 10 shown in FIG. 2 operates at 2500° F., the sleeves 36 are insulated by the walls so that they experience a temperature typically of 1900° F. The aluminum oxide rollers could withstand a temperature of up to 3200° F. At this temperature other things being the same, the sleeves would experience a temperature higher than 1900° F. Generally, the sleeves may be protected from heat by providing insulation, by cooling and by locating the sleeves further away from the high temperature zone.

Rollers of high purity aluminum oxide, 3.00 inches in outer diameter, 2.50 inches in inner diameter and 3.75 feet long supported in sleeves of 3.04 inch internal diameter which are spaced approximately 8.00 inches apart will support a tray load of approximately 30 lbs/sq. ft. at a furnace temperature of 2400° F. In a similar arrangement under similar conditions an array of rollers 4.00 inches outer diameter, 3.50 inches inner diameter and 3.00 feet long could support approximately 125 lbs/sq. ft.

It is to be understood that the invention herein shown and described is to be taken as a preferred embodiment and that various changes may be made by those skilled in the art without departing from the invention or the scope of the claims.

We claim:

1. A transport mechanism for a roller hearth furnace comprising:

a cylindrical roller;

a rigid retaining sleeve positioned at each end of said roller, said sleeve including an open end having an inner cylindrical surface loosely surrounding the end section of said roller for supporting said roller and forming a slip joint with said roller end section; and drive means attached to the end of said sleeve opposite said open end for rotating said sleeve;

said inner cylindrical surface of said sleeve, when rotated, frictionally engaging said roller end section, thereby rotating said roller.

2. The transport mechanism of claim 1 wherein said furnace is operable at temperatures of at least 2500° and said roller is of refractory material.

3. A transport mechanism for a high temperature continuous roller hearth type furnace operable at temperatures of at least 2500° F. comprising:

a plurality of ceramic rollers resistant to a temperature of at least 2500° F. arranged transverse to the path of travel of work therealong, said rollers forming a hearth for supporting work thereon, said rollers having end sections of substantially circular corss-sectional configuration;

a plurality of retaining sleeves, one associated with each end section of said rollers, each of said sleeves including an open end having an inner cylindrical surface loosely surrounding the end section of said roller for supporting said roller and forming a slip joint with said roller;

a shaft extending from and drivably connected to the end of each said sleeve opposite the open end thereof;

a journal on each said shaft;

bearing means mounting each said journal for rotary movement;

transmission means associated with each said shaft and drivably connecting all said shafts for rotating all said shafts, and thus all of said sleeves, in unison;

said inner cylindrical surface of each of said sleeves, when rotated, frictionally engaging said roller end section, thereby rotating said rollers; and means for continuously driving said transmission means.

4. A transport mechanism according to claim 3 wherein the open end of each of said sleeves associated with a roller end section defines a cylindrical cavity with a diameter larger than the outer diameter of the roller end section and said open end includes an abutment confronting the end of said roller, the abutments for sleeves at opposite ends of any roller being spaced apart by a distance slightly in excess of the maximum length of such single roller, said open ends thereby permitting thermal expansion of the rollers in all directions.

5. The transport mechansim of claim 1 wherein the open end of each of said sleeves defines a cylindrical cavity with a diameter larger than the outer diameter of the end portions of said roller and said open ends includes means for permitting limited travel of the roller along its longitudinal axis, said open ends thereby permitting thermal expansion of the roller in all directions.

6. The transport mechanism of claim 5 wherein said means for permitting limited travel of the roller includes a pair of abutments confronting the ends of said roller and spaced apart by a distance slightly in excess of the maximum length of the roller.

* * * * *